United States Patent

Clinard

[11] 4,099,598
[45] Jul. 11, 1978

[54] DRAIN SYSTEM

[76] Inventor: Ralph Clinard, 710 Queens Mill Ct., Houston, Tex. 77879

[21] Appl. No.: 708,554

[22] Filed: Jul. 26, 1976

[51] Int. Cl.² .................................................. F16N 31/02
[52] U.S. Cl. .................................... 184/106; 141/313; 141/340
[58] Field of Search .................... 141/10, 98, 114, 313, 141/314, 316, 331–345, 364, 369, 372, 379, 380; 150/8; 184/1.5, 106; 215/300

[56] References Cited

U.S. PATENT DOCUMENTS

| 247,393 | 8/1886 | Smith | 141/314 X |
|---|---|---|---|
| 950,387 | 2/1910 | Gordon | 150/8 |
| 2,780,081 | 2/1957 | Alexander | 141/341 |
| 3,145,408 | 8/1964 | Hertzel et al. | 141/338 X |
| 3,727,638 | 4/1973 | Zaremba et al. | 184/1.5 X |
| 3,874,478 | 4/1975 | Mantell | 184/1.5 |
| 3,967,697 | 7/1976 | Guenther | 184/1.5 |
| 4,022,257 | 5/1977 | O'Connell | 141/314 X |
| 4,054,184 | 10/1977 | Marcinko | 141/340 X |

Primary Examiner—Richard E. Aegerter
Assistant Examiner—Frederick R. Schmidt

[57] ABSTRACT

A system comprising a funnel stand and a receptacle such as a plastic bag operably attached to the stand for receiving liquids (e.g. oil) which then can be detached and discarded or stored if desired. The basic stand preferably includes a flat continuous bottom support connected by open sides to a substantially funnel-shaped top wall with a centrally disposed spout. A deformable receptacle (e.g. plastic bag) is removably attached at its open end to the spout, and is preferably supported by the bottom, especially as it is filled with liquid.

7 Claims, 6 Drawing Figures

U.S. Patent  July 11, 1978  4,099,598
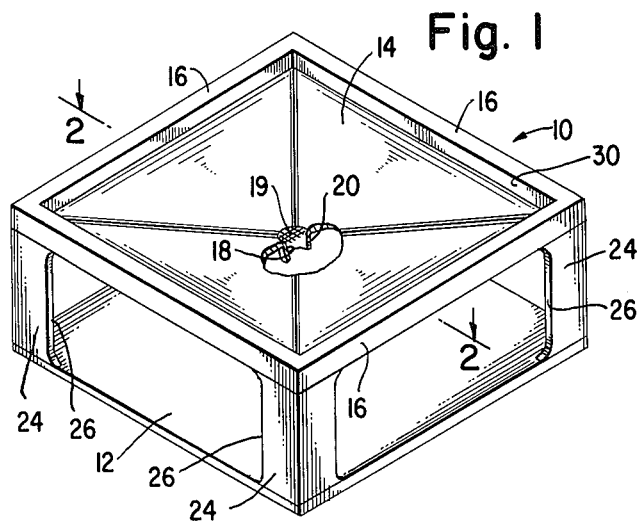
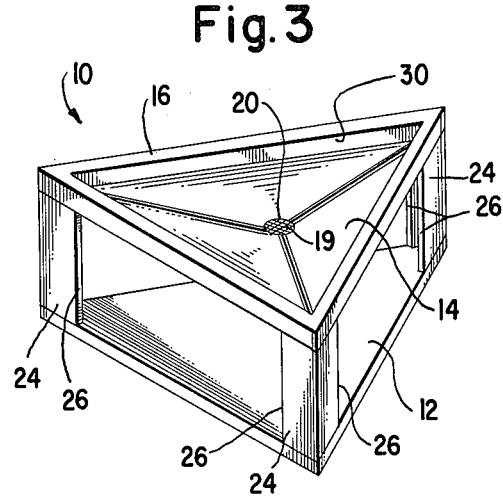
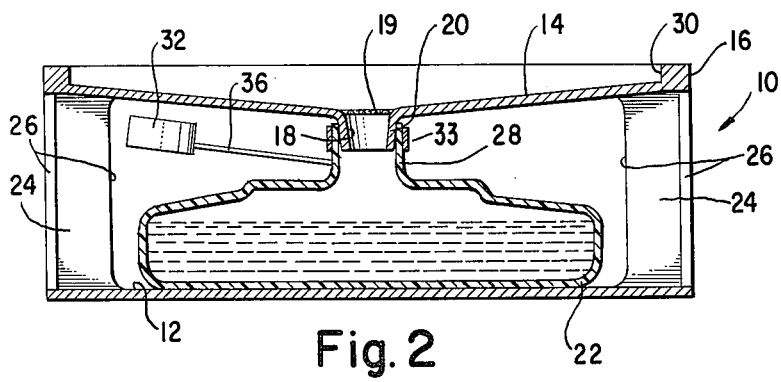
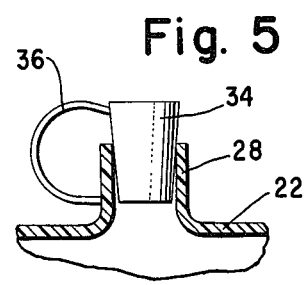
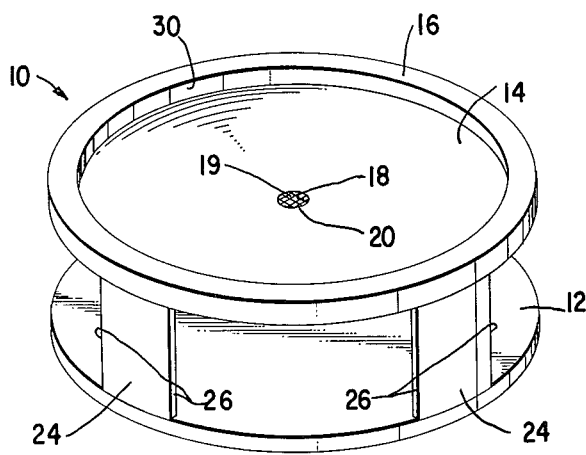
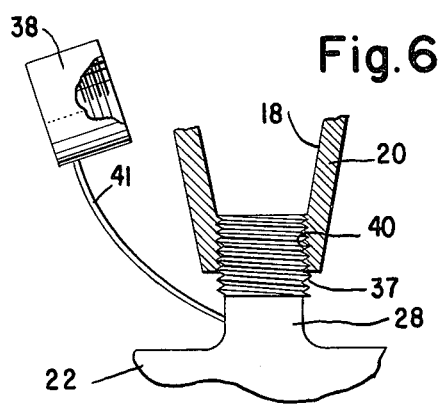

DRAIN SYSTEM

BACKGROUND OF THE INVENTION

It is generally known in the field of do-it-yourself servicing to provide relatively rigid unitary receptables for collecting and storing liquid such as oil as it drains from an engine (for example, see U.S. Pat. No. Re, 27,449). Most of such prior art employs a system where the oil must be emptied from the container if the container is to be reused, thus presenting a disposal or environmental problem. The use of a disposable plastic bag with complex structure which permits removal of the oil without having to remove the oil drain plug has also been taught but represents a rather complex system (see U.S. Pat. No. 3,874,478). Other prior art disclose various types of funnel receptacles such as in U.S. Pat. Nos. 1,554,589 and 1,951,498. However, in spite of various prior art attempts there still exists a need in the self-service automotive engine oil drain area for a relatively quick, economical, reliable and ecologically clean system for the collection of liquids and then subsequent ready disposal in a manner that will safeguard the environment.

SUMMARY OF THE INVENTION

The present invention relates to a system comprising a rigid funnel stand and a flexible detachable receptacle operably associated therewith for receiving liquids and permitting quick and easy subsequent disposal of the collected liquid in an environmentally safe manner.

The foregoing system has particular utility in the do-it-yourself service area for changing oil, antifreeze or the like from an engine and for ready disposal of the drained fluid in a non-polluting fashion. The oil is removed in an inexpensive bag, and the basic unit reused. The stand provides a passageway for receiving the liquid as it drains from the engine and causing it to flow into the flexible receptacle supported by the rigid bottom wall of the stand. The height of the stand may vary depending on where the engine to be drained is employed (e.g. riding lawnmover, vehicle, etc.) and the stand also may take a variety of shapes such as rectangular, circular or triangular. The top and bottom of the stand are rigidly interconnected by integral upstanding spaced members, with the sides being substantially open to permit insertion of the receptacle into the stand and its removal therefrom when the engine oil drain has been completed.

Having thus described the general nature of the invention and various aspects thereof, reference now will be made to the patent drawings which when taken in conjunction with the following detailed description of the invention will enable those skilled in the art to readily understand the operation, advantages and construction of it.

BRIEF DESCRIPTION OF THE DRAWINGS

FIG. 1 is a perspective view of a funnel stand according to the present invention.

FIG. 2 is a cross-sectional view taken substantially along the line 2—2 of FIG. 1 of the stand with a receptacle partly filled with liquid connected therewith.

FIG. 3 is an alternate funnel stand having a triangular configuration.

FIG. 4 is another funnel stand having a circular configuration.

FIG. 5 is an alternate type of closure for the receptacle.

FIG. 6 is another type of funnel stand connection and receptacle closure.

DESCRIPTION OF THE PREFERRED EMBODIMENT

Referring now to the drawings wherein like parts are designated by the same reference numbers throughout the several views, there is illustrated in FIG. 1 a perspective view of a funnel stand generally designated 10 constructed in accordance with the present invention. The stand 10 according to the preferred embodiment has a generally rectangular box-like shape, comprising a flat continuous bottom wall 12 and a top wall 14 which slopes inward from the bottom of raised edge 30 in a slightly downward direction toward the bottom wall. Centrally located in the top wall is an opening 18 from which extends downward a tapered spout 20. Typically a web 19 covers opening 18 to prevent the car drain plug or tools from falling through the hole. The spout terminates at a suiable distance below the top of the stand, for example, two inches, to permit a deformable receptacle such as plastic bag 22 to be located within the stand beneath the spout as best shown in FIG. 2. The top and bottom of the stand are interconnected by support members or braces 24 at each of the corners such that each of the sides of the stand are open as shown at 26. The overall height of the stand typically may be six inches and approximately eighteen inches in width and depth. This height will permit locating the stand under the drainage outlet of the engine and can be designed so as to be higher or lower depending on the height above ground of the general engine to be serviced. The stand may be of any suitable material. However, rigid plastic (e.g. polyethylene) is preferred for ease in manufacturing and resistance to degradation from contact with petroleum products, although it could be of metal if desired.

The bag 22 when empty will be relatively flat (at least the main body thereof) to facilitate storage and has a neck portion 28 which can be flexible (like the neck on a balloon) or slightly more rigid (like flexible plastic tubing) than the remainder of the bag or pouch. The neck as shown in FIG. 2 fits over the spout 20 and is sized to form a tight friction fit therewith. It is understood, however, that other means such as a tie or a rubber sleeve secured over the spout and rolled up such that it can be rolled down over the neck of the bag when in place over the spout (like the rolled sleeve used in vacuum cleaners to hold the dust collecting bag in place).

Bag 22 is typically made of flexible, deformable plastics, such as polyethylene, or polyethylene-nylon laminates, etc.

The procedure by which liquid can be collected by employing a system according to the present invention is to first place the bag 22 in the stand and secure the neck 28 over the spout 20. The bag should be large enogh so that the liquid when collected in the bag will not reach the neck portion which could result in excessive strain on the bag that could result in rupture. As shown in FIG. 2 the collected liquid (e.g. oil) fills the bag to a level well below the neck of the bag. The stand with the bag attached to the spout then is slid under the drainage opening of the engine being drained whether it is in a car, truck, lawnmover, tractor, etc. The drain plug is removed and the oil, antifreeze or other liquid is permitted to flow into the central opening 18 and through the spout 20 into the bag. If the opening is not located exactly under the engine drain the flowing liquid still will be directed to the opening because of the concave-like or sloping construction of the top wall. Also, by providing a raised edge 30 about the inner periphery of the top edge 16 with respect to the top wall the top effectively forms a reservoir for the draining liquid as it is being transferred to the bag. When the draining is completed the complete funnel stand and bag is removed from its location under the engine. The neck 28 is detached from the spout 20 and the bag removed from the stand by keeping grasp on the neck 28. Each bag is provided with a suitable closure to enable closing the bag after the liquid has been collected and the bag removed from the stand. As shown in FIG. 2 a preferred closure comprises a snap top lid 32 which snappingly engages the top of the neck 28 which can be reinforced as shown at 33 to facilitate maintaining the closure liquid tight.

The bag containing the oil can then be readily disposed of by placing it by the "do-it-yourselfer's" house garbage for collection therewith. This method allows the bags to be collected and then sent to a central recycling system, where the oil may be treated for reuse or burned.

Other types of bag closures also may be used and alternatives are shown in FIGS. 5 and 6. In FIG. 5 the empty plastic bag 22 has a closure comprising a tapered plastic cork 34 secured to the bag neck by a flexible connecting member 36. The embodiment of FIG. 6 also requires a threaded modification to the spout 20. The top of the neck 28 is threaded at 37 and has a screw cap 38 fixed thereto by strip 41 (or alternatively it can be a separate element). Strip 41 is adapted to be cut or torn off the neck to permit cap 38 to be screwed into place. The bottom of the spout 20 is internally threaded as shown at 40 for receiving the threaded neck which is held in place until the bag has been filled by the drained oil, after which the bag is detached.

While the preferred embodiment of the stand is rectangular, it may comprise a variety of different configurations some of which are shown in FIGS. 3 and 4. The triangular shape of FIG. 3 or the circular shape of FIG. 4 may be desirable in certain instances where it proves less expensive to manufacture the stand or is more compatible with the particular size bag used. Regardless of the stand shape the overall construction includes a sloping top wall interconnected to the bottom wall by means of braces or supporting members. However, a possible modification of the stand may comprise providing only a central cup-like or convex sloping portion containing the opening 18 and the downward extending spout 20. The central portion can be supported by ribs or support struts connected at one end to the stand sides at the top edge and at the opposite end to the central portion. This will save the amount of material needed to form the top wall and to ensure that the liquid drains through the spout and into the bag in the stand. The central portion is made sufficiently large to receive and channel the draining liquid through the spout into the bag.

While a stand having a bottom wall for supporting the bottom of the deformable bag is preferred (to support the weight of the oil when accumulated in the bag), it is possible to simply have the bag sufficiently fastened to the spout so that it hangs in the air or is supported by the ground during the collection step and thus requires no bottom stand support.

While there has been shown a preferred embodiment and various modifications of the present invention, further modifications which are within the scope of this invention will become apparent to those skilled in the art. Accordingly, in order to determine the true scope of the invention, reference should be made to the appended claims.

What is claimed is:

1. A collection system for collecting spent liquid from a vehicle comprising in combination:
   a substantially rigid stand adapted to be moved under a vehicle to receive spent liquid, said stand having an open top wall, an open sidewall, and a flat substantially continous bottom wall;
   said bottom wall adapted to be seated on the ground and to support said stand;
   said top wall inwardly sloping to an opening therein so as to receive and channel spent liquid from said vehicle through said opening, a spout integrally connected to said opening and extending downward from said opening for a predetermined distance;
   a deformable receptacle operably connected with said spout for receiving said spent liquid, the bottom of said receptacle being fully supported on the bottom wall of said stand when it receives spent liquid under said vehicle as well as when the stand is removed from under said vehicle and a plurality of spaced sidewall members, firmly connecting said bottom wall to said top wall and defining a plurality of open sidewalls to permit easy removal of the deformable receptacle in both its filled and unfilled conditions.

2. The system of claim 1 wherein said stand comprises a rectangular configuration.

3. The system of claim 1 wherein said stand comprises a triangular configuration.

4. The system of claim 1 wherein said receptacle includes closure means operably associated therewith for closing said receptacle after it is removed from said spout.

5. The system of claim 1 wherein said top of said stand is substantially concave at least surrounding said opening.

6. The system of claim 1 wherein said top wall of said stand extends continuously from the periphery thereof in a downward slope toward said opening which is centrally located in said top wall.

7. The system of claim 1 wherein said stand has spaced supports for interconnecting said top and bottom walls at the periphery thereof.

* * * * *